Nov. 5, 1957 D. HOPF 2,812,439
TUNING INDICATION CIRCUIT-ARRANGEMENT FOR USE IN RECEIVERS FOR FREQUENCY-MODULATED OSCILLATIONS
Filed Dec. 12, 1955
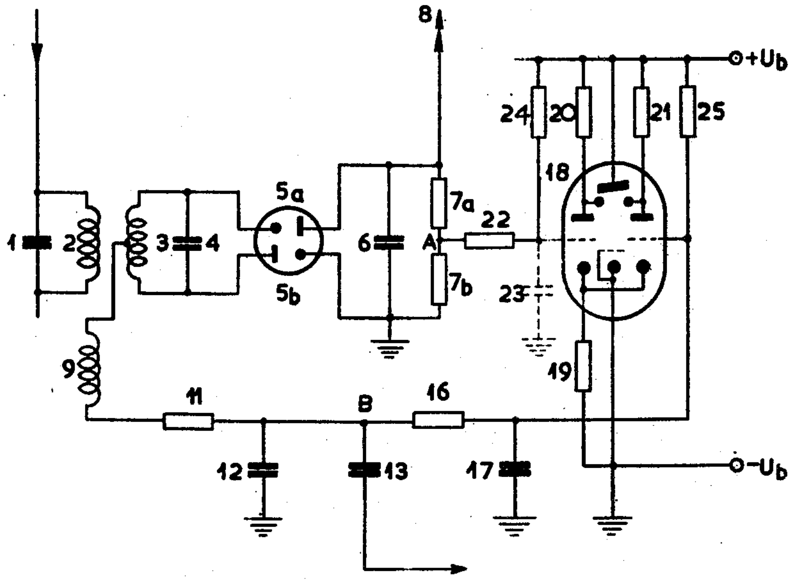
INVENTOR
DIETRICH HOPF
BY [signature]
AGENT

United States Patent Office 2,812,439

Patented Nov. 5, 1957

2,812,439

TUNING INDICATION CIRCUIT-ARRANGEMENT FOR USE IN RECEIVERS FOR FREQUENCY-MODULATED OSCILLATIONS

Dietrich Hopf, Hamburg, Schnelsen, Germany, assignor, by mesne assignments, to North American Philips Company, Inc., New York, N. Y., a corporation of Delaware Application December 12, 1955, Serial No. 552,534

1 Claim. (Cl. 250—40)

This invention relates to frequency-modulation tuning indicators, and relates more particularly to an indicator which is an improvement over the type disclosed in U. S. Patent 2,784,316, issued March 5, 1957.

U. S. patent application Serial No. 442,081, filed July 8, 1954, describes a particularly simple form of the tuning-indication circuit-arrangement for use in receivers for frequency-modulated oscillations according to U. S. Patent 2,784,316. The circuit-arrangement in accordance with the said patent comprises a non-symmetrical ratio-detector circuit and a cathode-ray tuning indicator tube comprising two control members, which are independent of each other.

The use of a non-symmetrical ratio-detector circuit has the advantage that the diode systems for the ratio-detector can be lodged in the bulb the same amplifier tube (for example a tube of the type EABC 80), which is not feasible with a symmetrical discriminator circuit on account of the limited number of contact pins. The non-symmetrical ratio-detector circuit moreover has the advantage that from the anode of the diode with a non-earthed cathode a gain control voltage can be derived which is twice as high as is available with a symmetrical circuit.

The indicator tube of a circuit according to said Serial No. 442,081 is controlled by means of two mutually independent amplifier elements, a rectified intermediate-frequency voltage being applied to the control grid of one of said amplifier elements and a rectified intermediate-frequency voltage and a control voltage depending upon the detuning being applied to the control grid of the other amplifier element, while the cathodes of the two amplifier elements are connected to a source of supply voltage through a resistor which produces a considerable, preferaby strong negative feedback.

This circuit-arrangement has inter alia the advantage of permitting the use of a simple tuning indicator tube.

For tuning indication, however, the non-symmetrical ratio-detector circuit involves a difficulty in that its low-frequency output voltage comprises not only the detuning-dependent direct voltage component but also a considerably higher gain control voltage component, for example ten to fifteen times as high, in accordance with the value of the input signal, so that correct tuning indication is not directly feasible.

The aforesaid circuit-arrangement according to Serial No. 442,081 operates as a cathode amplifier with respect to the mutually equal component of the control voltages, applied to the control grids of the two amplifier elements. Said equal parts are proportional to the rectified intermediate-frequency voltage and the cathode of said cathode amplifier is at least approximately at the control potential applied with the same value to the two control grids. In this manner it is achieved that said detuning-independent rectified intermediate-frequency voltage components, do not affect or only slightly affect the tuning indicator tube, while the detuning-dependent component of the rectified intermediate-frequency voltage, which is applied to one only of the control grids, is practically wholly operative for tuning indication.

As a result of the use of a cathode resistor which produces a considerable, preferably strong negative feedback, a considerable voltage drop occurs in the cathode circuit. Since the intermediate-frequency voltage component also assumes comparatively high negative values it is necessary to compensate a part of said voltage drop. According to said Serial No. 442,081, this is either achieved by means of an auxiliary voltage which is negative with respect to earth and connected in the cathode circuit of the amplifier tube or by means of an auxiliary voltage which is positive relatively to earth and connected to the alternating voltage earthing point of the ratio-detector circuit. The first solution cannot always be used, since a sufficient negative voltage source is not available in every receiver and particularly not in an A. C./D. C.-receiver, said voltage source being moreover loaded by the cathode currents of the several amplifier tubes and sometimes also by that of the indicator tube. The second solution diminishes or neutralizes the rectified intermediate-frequency voltage which can normally be taken from a ratio-detector for gain-control-purposes, and this is usually undesirable.

In accordance with the invention said disadvantages are avoided by supplying a substantially constant direct current to the control-grid circuits of the two amplifier elements, thus producing a positive bias which as least approximately compensates the negative grid bias produced across the cathode resistor.

The control grid of each amplifier element is preferably connected by way of a corresponding series-resistor to the corresponding source of control voltage and thus earthed relatively to direct current, if desired through an additional leakage resistor, and is connected through a corresponding supply resistor to the positive terminal of the source supplying said direct current. It is advisable that the series-resistors should have a value, which is high relatively to that of the load resistor of the ratio-detector and which is preferably ten to a hundred times as high as the value of said load resistor, and each supply resistor should have a value which is high relatively to that of the corresponding series-resistor, and which is preferably three to thirty times as high as that of said series-resistor. The voltage of the supply, to which the supply resistors are connected, is at least three times and preferably at least ten times as high as the highest rectified intermediate-frequency voltage applied to the control grids of the amplifier elements. As a result of said ratios between the several resistors and voltages, the direct current through the preliminary resistors is at most $1/20$ and preferably less than $1/50$ of the current passing at the maximum value of the intermediate-frequency signal through the load resistor of the ratio-detector, so that no undue disturbance is produced by the additional direct current which also passes through component parts of the ratio-detector.

It is to be noted that a troublesome feedback is avoided, since the positive compensation voltage applied to the control grids is taken from a fixed source, for example from the source of anode voltage. Furthermore, discrepancies between the characteristics of the amplifier elements cannot cause disturbances.

In order that the invention may be readily carried into effect one embodiment will now be described in detail with reference to the accompanying drawing which represents, by way of example a conventional ratio-detector circuit comprising a tuning-indication circuit in accordance with the invention, and in which a frequency-modulated current is supplied from the last intermediate frequency amplifier tube to a circuit 1, 2 and transmitted through a preferably loose coupling to a secondary resonant circuit 3, 4. Two diodes 5*a* and 5*b* having opposite polarities are connected in a known manner to the resonant circuit 3, 4, the cathode of the diode 5*b*, which cathode is not connected to the circuit 3, 4, being earthed. A capacitor 6 having a comparatively high value and with a parallel load resistor made up of two substantially equal parts 7*a* and 7*b* are connected between the anode of the diode 5*a* and earth. From the anode of the diode 5*a* an automatic gain control voltage can be taken, as indicated by a double-headed arrow 8.

To the midpoint of coil 3 is connected a further coil 9 (tertiary coil) which is preferably tightly coupled to the coil 2. The demodulated low-frequency voltage set up at B can be taken at the ends of said coil 9 by way of an intermediate-frequency smoothing circuit 11, 12 and of a blocking capacitor 13. The circuit arrangement so far described is known per se.

At the junction point A of the parts 7*a* and 7*b* of the load resistor of the ratio-detector a voltage occurs which corresponds to the rectified intermediate-frequency voltage and varies in accordance with the amplitude of the input signal, for example between 0 and −20 volts.

At point B, said low frequency voltage and in addition a direct voltage occurs, which has approximately the same value as the voltage set up at A and corresponding to the intermediate-frequency voltage amplitude. To this voltage a further voltage component is added, which depends upon the detuning (detuning voltage) and amounts to approximately 2 to 3 volts. Said voltage component at point B is used for tuning indication. In accordance with the invention the points A and B are connected through series-resistors 22 and 16 to the control grids of two amplifier elements (triodes) of a tuning indicator tube 18. The cathodes of the amplifier elements are earthed via a common cathode resistor 19. This resistor produces a considerable negative feedback with respect to the intermediate-frequency voltage component applied to the two control grids. The cathode of the indicating portion of the tube 18 is directly earthed. The anodes of the two amplifier elements of the tube 18 are connected through load resistors 20 and 21 to the source of anode voltage $+U_b$, to which the viewing screen of the indicating portion of the tube 18 is likewise directly connected. Control electrodes of the indicating portion of the tube 18 are connected to the anodes of the amplifier elements. In the drawing, these electrodes are indicated by points below the viewing screen anode. They serve to produce the desired control of the cathode-ray in accordance with the voltage on the amplifier anodes for indication purposes.

That end of the series-resistor 16 which is connected to one of the control grids, is likewise earthed through a capacitor 17 in order to by-pass the low frequency alternating voltage on said grid. If desired, the other control grid may also be earthed via a capacitor 23 indicated in broken lines and connected between the resistors 22 and 24.

The cathode-resistor 19 has such a value that, in the case of the grids being earthed (voltages at A and B equal to zero), a voltage drop occurs which is approximately of the same order and preferably appreciably higher than the highest rectified intermediate-frequency voltage at point A, which voltage may, for example, be −20 volts. This voltage component produces a negative voltage in the control-grid circuit and, in accordance with the invention, is compensated by a small direct current which flows to earth from the positive terminal $+U_b$ of the supply (for example +200 v.) through supply resistors 24 and 25 respectively of, say, 10 megohms and the series-resistors 22 and 16 respectively of, say, 1, 2 megohms connected to the control grids. In general, the resistors 7*b* and 11 are practically negligible and said direct current produces a positive bias of, say, approximately 15 volts on the control grids of the amplifier element. The cathode resistor 19 is chosen to be such that, in the absence of an intermediate-frequency signal, a slightly higher voltage of, say, 15.5 volts is produced across it, so that the amplifier elements operate with an effective control-grid bias of −0.5 volt in said condition.

The direct current producing the positive compensation voltage in the grid circuits thus amounts to approximately 17 $\mu$a. Although this current also passes through the ratio-detector and in particular through the resistor 7*b*, this does not give rise to disturbances, even if it is larger and amounts, for example, to 100 $\mu$a., above all since the demodulation current through the resistors 7*a* and 7*b* for maximum intermediate-frequency signal is of the order of 1 ma. (for example 40 volts via $2\times16$K/ohms).

It will be appreciated that the influence of the cathode-resistor 19 on the setting of the working point is compensated in the simplest manner. As a result of the value of the voltage $+U_b$ relatively to the highest control voltage applied to the control grids of the amplifier elements, the positive voltage supplied to the control-grid circuits by means of resistors 24, 22 and 25, 16 respectively is substantially constant, hence no decrease in indication sensitivity occurs.

What is claimed is:

A frequency-modulation tuning indicator circuit comprising a ratio detector circuit having a load resistance across which a rectified signal voltage is produced and having a terminal at which a rectified signal voltage is produced along with a control voltage which varies in accordance with any detuning of said ratio detector circuit with respect to incoming signals, a cathode-ray tuning indicator tube having a pair of beam-deflecting electrodes, two amplifier devices each having a cathode, a grid and an output electrode, means respectively connecting said output electrodes to said beam-deflecting electrodes, a first grid circuit including means connecting said terminal to one of said grids, a second grid circuit including means connecting the other one of said grids to a point on said load resistance, a common cathode resistor connected at an end thereof to both of said cathodes, a circuit including a source of voltage connected between said output electrodes and the other end of said cathode resistor, said cathode resistor producing a positive bias voltage at said cathodes thereby effectively biasing said grids negatively with respect to said cathodes, and means connected to supply a substantially constant direct current in said first and second grid circuits thereby to apply to said grids a positive bias voltage which compensates for said negative grid bias.

References Cited in the file of this patent

UNITED STATES PATENTS

| | | |
|---|---|---|
| 2,502,293 | Vilkomerson | Mar. 28, 1950 |
| 2,630,527 | Vilkomerson | Mar. 3, 1953 |